(12) United States Patent
Emek

(10) Patent No.: US 6,333,085 B1
(45) Date of Patent: Dec. 25, 2001

(54) RESISTANT WINDOW SYSTEMS

(75) Inventor: Mordechay Emek, Kfar Shmaryahu (IL)

(73) Assignee: Arpal Aluminum, Ltd., Lod (IL)

( * ) Notice: Subject to any disclaimer, the term of this patent is extended or adjusted under 35 U.S.C. 154(b) by 0 days.

(21) Appl. No.: 09/435,851

(22) Filed: Nov. 8, 1999

(51) Int. Cl.$^7$ ................................. E04B 3/24; F41H 5/00
(52) U.S. Cl. ................... 428/34; 52/204.593; 52/786.1; 89/36.01; 89/36.04
(58) Field of Search ........................... 428/34, 426, 428, 428/415, 192, 13; 52/786.1, 204.591, 204.593; 296/84.1; 89/36.02, 36.05, 36.01, 36.04; 109/49.5, 50, 58.5

(56) References Cited

U.S. PATENT DOCUMENTS

| | | |
|---|---|---|
| 3,624,238 | 11/1971 | McKenzie . |
| 3,657,057 | * 4/1972 | Shorr ................................. 156/331 |
| 4,312,903 | 1/1982 | Molari, Jr. . |
| 4,485,603 | * 12/1984 | Derner ................................. 52/398 |
| 4,625,659 | 12/1986 | Saelzer . |
| 5,059,467 | 10/1991 | Berkovitz . |

* cited by examiner

*Primary Examiner*—Donald J. Loney
(74) *Attorney, Agent, or Firm*—Oliff & Berridge PLC

(57) ABSTRACT

A blast and impact resistant double glazing window system comprising a front laminated window facing the direction of impact and a rear laminated window opposite the direction of impact. The front and rear laminated windows are spaced apart from one another by a hermetically sealed space and each of the front laminated window and the rear laminated window is one of an impact resistant window and a blast resistant window. The front laminated window is fixed to a first frame fixable within an opening of a wall, and the rear laminated window is fixed to a second frame fixable within the wall's opening.

10 Claims, 2 Drawing Sheets

RESISTANT WINDOW SYSTEMS

FIELD OF THE INVENTION

The present invention is generally in the field of resistant window systems and more specifically it is related with fixed double glazing window systems and is concerned with such window systems which offer improved protection against both blast and impact hazards.

The terms blast window and blast resistant refer to the ability of a window system to withstand blast caused for example by an explosion of a bomb, significantly strong wind, etc. The terms impact window and impact resistant refer to the ability of withstanding impact force applied for example by kinetic energy of arms or shrapnel, force applied by vandalism actions, etc.

BACKGROUND OF THE INVENTION

Double glazing windows typically comprise an outer window pane and an inner window pane spaced apart from the first window pane, with a sealed space between the window panes. The sealed space typically holds dries air or other gas and serves for improving thermal isolation of the construction in which the window is installed. The gas is dried so as to eliminate condensation within the sealed space.

Such double glazing windows may be fixed window systems (wherein the framework is fixed within an opening in a wall and the window is not capable of being opened), casement window systems (swingably or tiltably opened), or sliding window systems.

The ever-growing threat of what was in the past refried to as non conventional war, namely chemical and biological war, has led to some recent requirements to provide blast-resistant and gas-tight window systems. In addition, it is often a requirement that such window systems also have improved resistance to impact hazards, such as, for example, resistance to bullets fired from firearms, shrapnel of explosive charges and bombs, and even vandalism, e.g. attempts to break into a building or crowds trying to brake through.

A variety of windows offer blast resistance and impact resistance solutions, most of which typically offer a single type of protection, namely blast resistant or impact resistant. Other window systems offer dual protection but do not provide the climatic benefits of double glazing window systems. One considerable disadvantage of known window systems is that a single, reinforced impact-resistant laminated window absorbs also some of the blast energy (owing to its relative rigidity) and in many cases may forcefully fly into a room causing severe damage and casualties.

Furthermore, for fixing a reinforced laminated window of the aforementioned type within an opening in a wall, a suitable structure and reinforcement of the opening are required, which at times are not feasible for retrofit.

U.S. Pat. No. 3,624,238 is concerned with a bullet resistant structure of laminated character comprising outer faces or piles of safety glass with an intermediary ply formed of a polycarbonate a resin.

U.S. Pat. No. 4,312,903 deals with an impact resistant double glazed structure and is concerned in particular with the thickness of the layers of the laminated window panes, and their chemical compositions.

U.S. Pat. No. 5,059,467 is concerned with a protective ballistic panel including a first-impact, front layer and a second rear layer. The layers being spaced from one another by a semi-elastic material, defining a sealed space. However, the panel is for use as a personnel protective shield and is not concerned at all with providing blast resistant protection or with serving as a window system.

U.S. Pat. No. 4,625,659 discloses a bullet and explosion proof window or door system comprising two spaced apart panels, whereby the outer panel is spaced from a support soffit such that a gap is formed for providing a ventilation channel. However, peripheral portions of the panels are fitted with a security layer in order to prevent projectiles from entering through the ventilation gap.

It is an object of the present invention to provide a window system offering impact and blast resistance whilst not interfering with its function as a window, namely, providing good visibility therethrough as well as good climatic and acoustic isolation between an in-side and on out-side thereof.

SUMMARY OF THE INVENTION

According to the present invention there is provided a blast and impact resistant double glazing window system comprising a front laminated window facing the direction of impact and a rear laminated window opposite the direction of impact, said front and rear laminated windows being spaced apart from one another by a hermetically sealed space; each of the front laminated window and the rear laminated window being one of an impact resistant window and a blast resistant window; the front laminated window is fixed to a first frame fixable within an opening of a wall, and the rear laminated window is fixed to a second frame fixable within the wall's opening.

By a most preferred embodiment, the front laminated window is impact resistant and the second laminated window is blast resistant. The terms impact resistant and blast resistant define the mechanical properties of the laminated window to withstand impact and blast threats, respectively, as known per se.

Preferably, the sealed space between the laminated windows is filled with a dried gas, such as, for example, dries air. This arrangement improves climatic and acoustic isolation and prevents condensation of liquid vapor within the sealed space.

According to a preferred embodiment, either or both the first frame and the second frame are fixed to the wall in a gas-tight manner so as to prevent noxious gases from entering the room.

According to still a preferred embodiment, wherein the front laminated window is larger than the rear laminated window. Alternatively, the front laminated window is smaller than the rear laminated window.

Typically, the front laminated window has an outer face corresponding with an exterior side of the wall, and the rear laminated window has an inner face corresponding with an interior side of the wall; the first frame is in-accessible from the exterior side. According to one particular such design, at least a peripheral portion of the outer face of the front laminated window is concealed by an overlapping portion of the wall.

The first frame and the second frame may be fixed to one another, with one or both of the first frame and the second frame being fixed to the wall or, alternatively, each of the first frame and the second frame are independently fixed to the wall.

BRIEF DESCRIPTION OF THE DRAWINGS

In order to understand the invention and to see how it may be carried out in practice, some preferred embodiments will now be described, by way of non-limiting examples only, with reference to the accompanying drawings, in which.

DETAILED DESCRIPTION OF PREFERRED EMBODIMENTS

Figure 1:
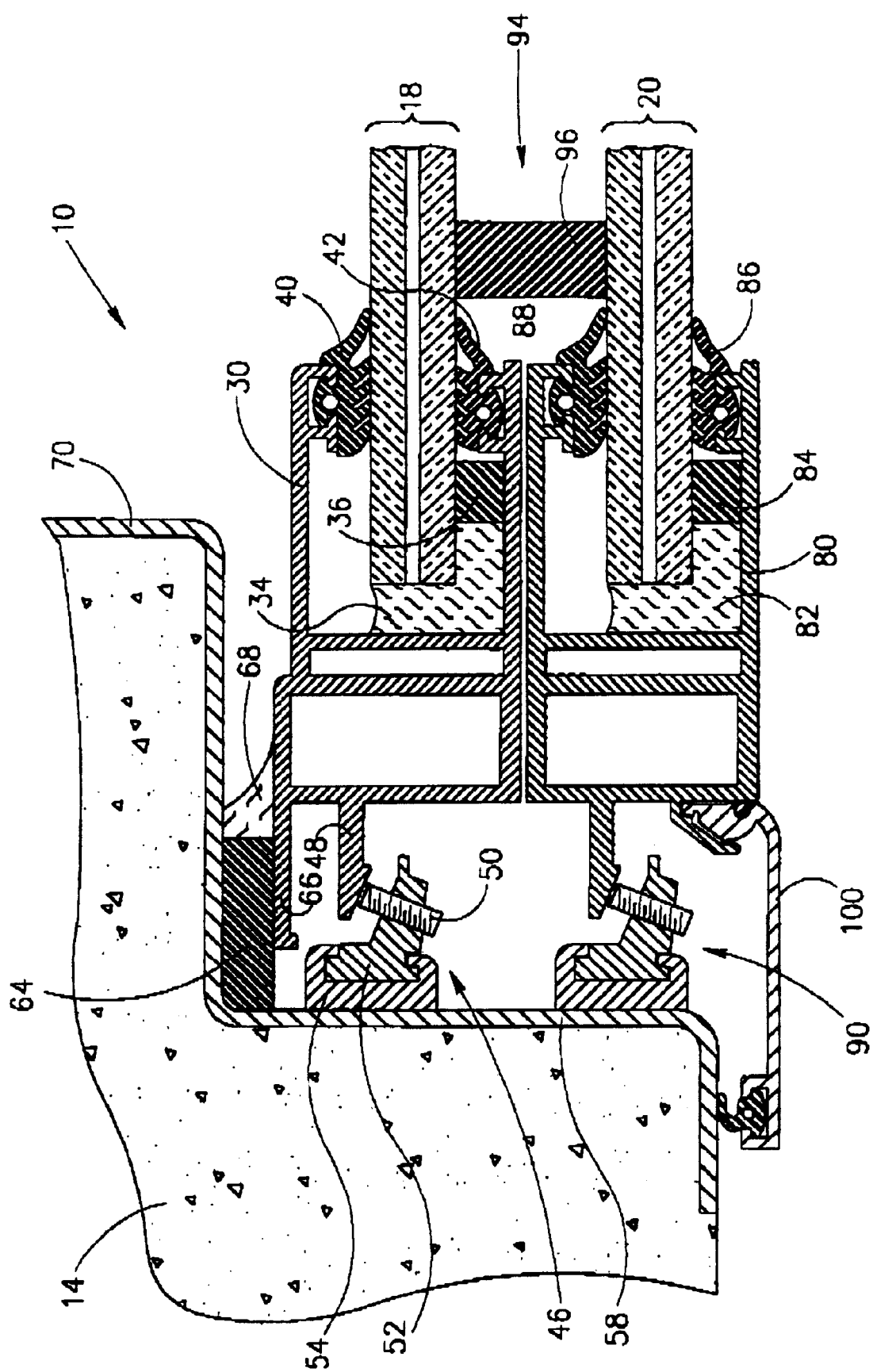
FIG. 1 is a horizontal section through a portion of a window in accordance with a first embodiment of the invention.

Reference is first being made to FIG. 1 illustrating a sectional portion of a double glazing window system generally designated 10 mounted within an opening of a wall 14. Window system 10 comprises a front laminated window 18 and a rear laminated window 20, wherein the front laminated window 18 is external, namely facing the direction of expected impact (e.g. vandalism, gun shots, bomb explosion, etc.), and the rear laminated window 20 is interior, namely facing the structure's interior.

Typically, the front laminated window 18 is an impact resistant window comprising, in the present example, two layers of glass embedding between them a layer of polycarbonate rendering the window impact resistant, as known per se. The rear, inner laminated window 20 is a blast resistant window and in the present example comprises two layers of glass embedding between them a layer of transparent elastic/resilient material such as polyvinylbutyl (PVB), etc. rendering the window some elasticity as known per se, suitable for withstanding blasts.

It should be appreciated by a person versed in the art, that the impact resistant front laminated window 18 and the blast resistant rear laminated window 20 may each comprise several layers of glass embedding between them several layers of reinforcing materials as well known in the art.

The front laminated window 18 is attached to a first frame 30 by an essentially flexible adhesive material 34 applied to the frame 30 and to respective portions of laminated window 18. A gasket 36 prevents flow of the adhesive material when applied.

Further notice there are two resilient rubber seal members 40 and 42 extending between the laminated window 18 and corresponding extensions of frame 30 for improved sealing and support of the laminated window therebetween.

Frame 30 is fixed to the wall 14 by a plurality fixture assemblies 46 (only one seen) wherein a leg 48 of frame 30 laterally extends and is engageable by an adjustable bolt 50 bearing against against leg 48 from a suitable carrying profile 52 attached to a profiled member 54, the latter connected in turn to a metal liner 58 embedded within the opening of the wall 14. The number and location of fixture assemblies along the frame depends on parameters such as window size, window weight, expected impact to withstand, etc, as known in the art.

As can further be seen, there is a sealing member 64 applied between liner 58 and extension 66 of frame 30, and a sealing substance 68 is applied for increasing sealing therebetween.

The second, rear laminated window 20 is attached to a second frame 80 in a similar manner as explained in connection with the front laminated window 18, namely by an adhesive substance 82 and comprising a profiled gasket 84 and two resilient seal members 86 and 88.

The second frame 80 is secured within the opening in the wall 14 by a fixture mechanism generally designated 90 which is similar to fixture mechanism 46 fixing the first frame 30 to the wall. However, the first frame and the second frame are independently fixed within the opening of the wall.

A space 94 between the first window 18 and the second window 20 is hermetically sealed by a gasket 96, tightly bearing between inner glass surfaces of windows 18 and 20. Typically, the space 94 comprises dried air or other gas, so as to prevent evaporation over the window panes as known per se.

It is also noticeable that an external wall portion 70 overlaps a portion of the window to prevent damage to the fixture assembly 46 by bullets, shrapnel vandalism, etc.

It is further noted that a cover profile 100 is fixed at one end thereof to the second frame 80, for concealing the fixture mechanisms 46 and 90 and to prevent unauthorized tampering therewith.

Figure 2:
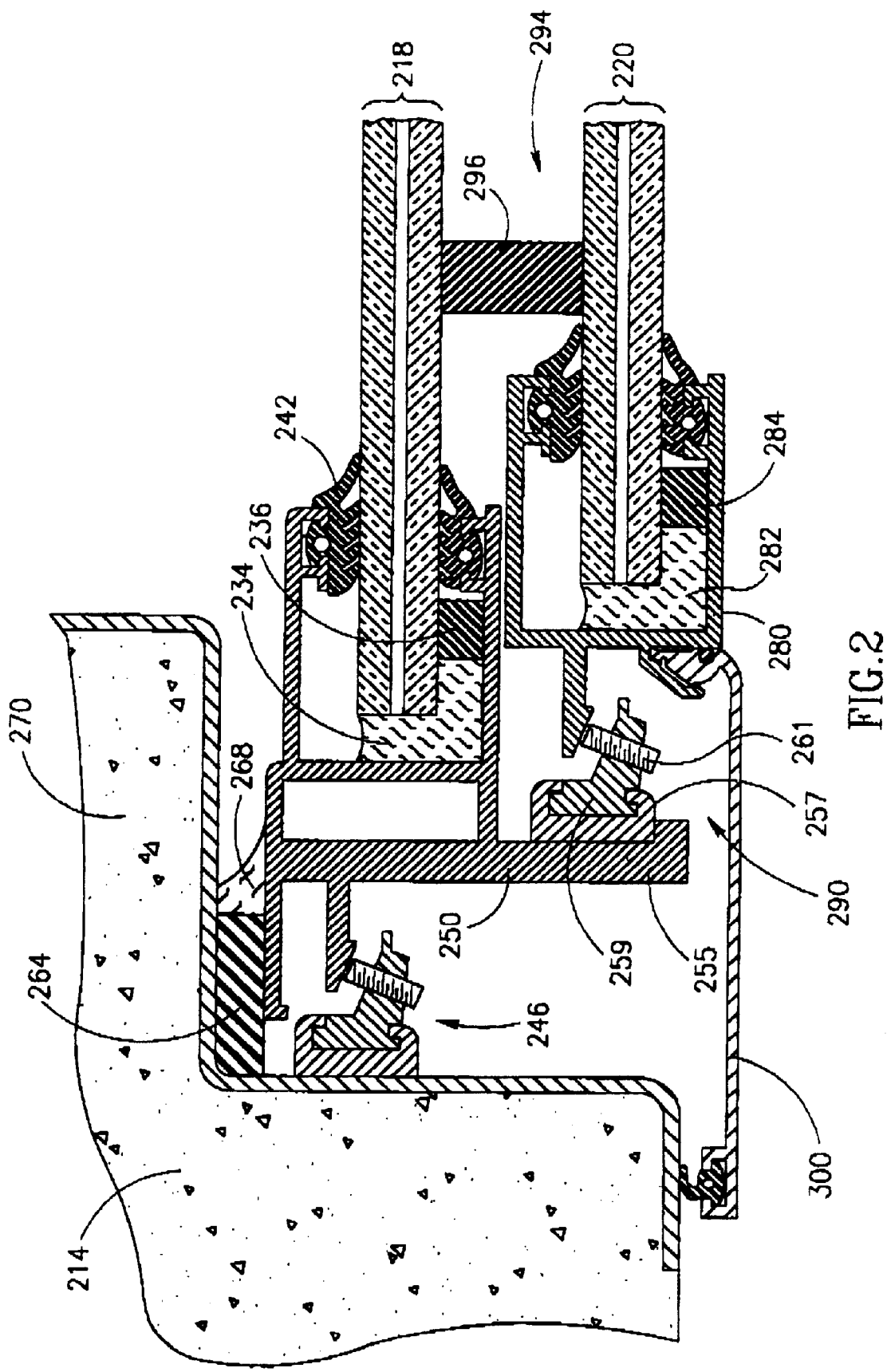
FIG. 2 is a horizontal section through a portion of a window in accordance with the second embodiment of the invention.

Further attention is now directed to FIG. 2 wherein for the sake of simplicity, elements which have already been disclosed with reference to FIG. 1 are given the same reference number shifted by 200.

The front laminated window 218 is fixed to the wall 214 by a first frame 250 fixed to the wall 214 by fixture mechanism 246. However, the first frame 250 comprises an extension 255 carrying a profiled member 257 which in turn supports member 259 through which bolt 261 extends for supporting the second frame 280 as explained with reference to frame 80 of FIG. 1. The second frame 280 supports a rear laminated window 220.

It is further noticed that the rear laminated window 220 is smaller than the front laminated window 218 resulting in a smaller frame 280, respectively. According to this arrangement there is improved accessibility to the fixture mechanisms 246 and 290.

Also shown in the embodiment of FIG. 2 there is an overlapping wall portion 270 rendering the window system in-accessible from the exterior side of the window system and temper-proof. A profile 300 is attached to the second frame 280 and serves also to prevent unauthorized tampering of the fixture mechanisms 246 and 290 and for decoration.

Whilst preferred embodiment have been shown and described, it is to be understood that it is not intended to limit the disclosure of the invention, but rather it is intended to cover all modifications and arrangements falling within the spirit and the scope of the invention, mutatis mutandis.

For example, a large variety of laminated windows may be provided, each varying in its mechanical properties and dimensions. The windows may be transparent, tinted, opaque, etc. Furthermore, different fixture means may be provided for securing the first and second frames to the wall and other arrangements may be provided for securing the laminated windows to their respective frames.

What is claimed is:

1. A blast and impact resistant double glazed window system comprising a multi-layer front laminated window facing the direction of impact and a multi-layer rear laminated window opposite the direction of impact, said front and rear laminated windows being spaced apart from one another by a hermetically sealed space filled with a dried gas; the front laminated window having an impact-resistant structure and the rear laminated window having a blast resistant structure; the front laminated window being fixed to a first frame fixable within an opening of a wall, and the rear laminated window being fixed to a second frame fixable within the wall's opening.

2. A window system according to claim 1, wherein the sealed space between the laminated windows is filled with dried air.

3. A window system according to claim 1, wherein either or both the first frame and the second frame are fixed to the wall in a gas-tight manner.

4. A window system according to claim 1, wherein the first frame is larger than the second frame.

5. A window system according to claim 1, wherein the front laminated window is larger than the rear laminated window.

6. A window system according to claim 1, wherein the front laminated window has an outer face corresponding with an exterior side of the wall, and the rear laminated window has an inner face corresponding with an interior side of the wall; wherein the first frame is in-accessible from the exterior side.

7. A window system according to claim 6, wherein at least a peripheral portion of the outer face of the front laminated window is concealed by an overlapping portion of the wall.

8. A window system according to claim 1, wherein the first frame and second frame are independently fixed to the wall.

9. A window system according to claim 1, wherein the second frame is fixed to the first frame.

10. A window system according to claim 1, wherein the structure of the rear laminated window possesses sufficient elasticity to withstand blast forces.

* * * * *